INVENTOR.
WALTER H. CARSTENSEN
DONALD G. DAVEY
BY
ATTORNEYS

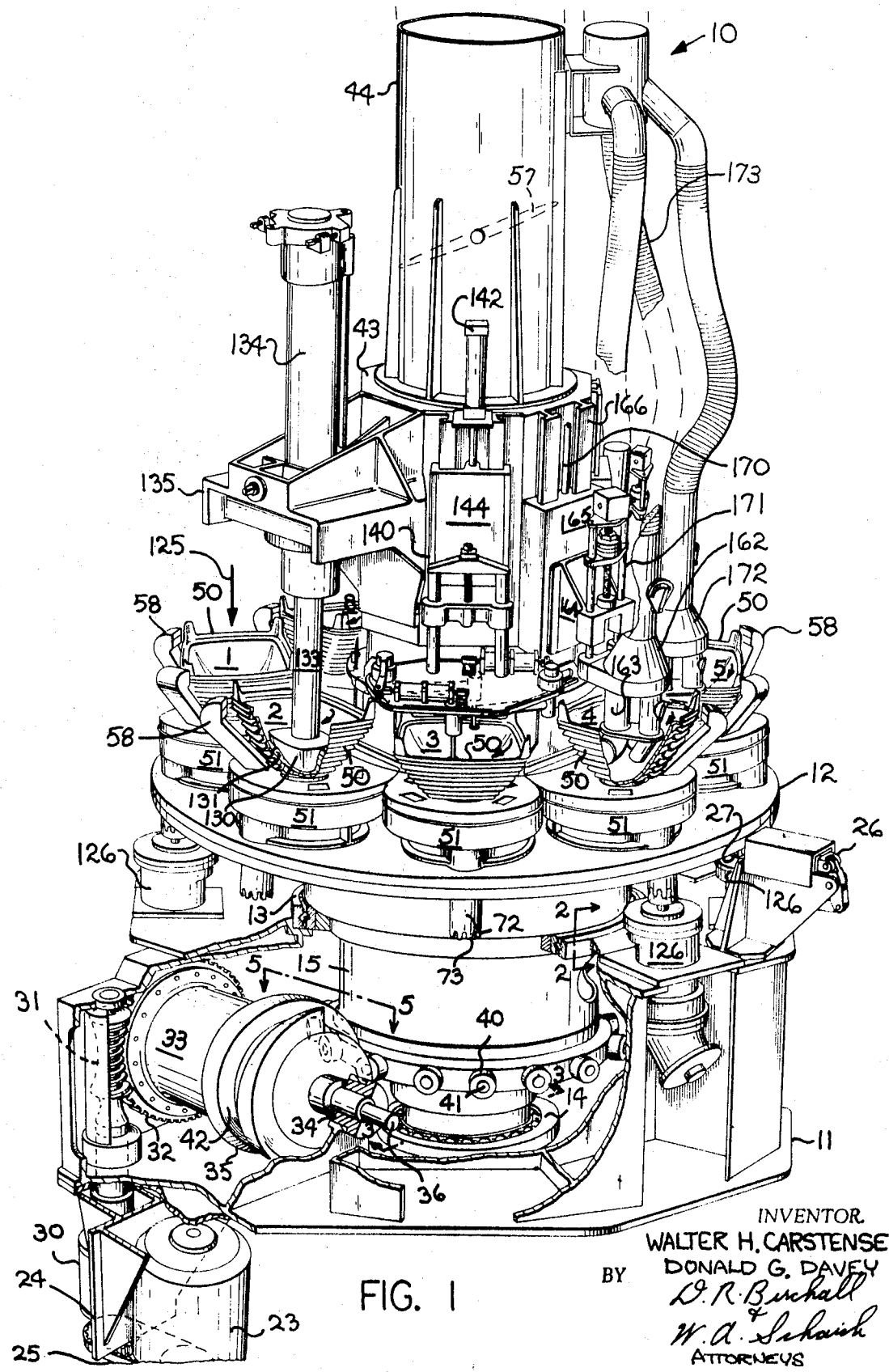

United States Patent Office

3,589,882
Patented June 29, 1971

3,589,882
APPARATUS AND METHOD FOR FORMING
HOLLOW GLASS ARTICLES
Walter H. Carstensen, Toledo, and Donald G. Davey, Oregon, Ohio, assignors to Owens-Illinois Inc.
Filed Apr. 28, 1967, Ser. No. 634,706
Int. Cl. C03b 9/46, 11/00
U.S. Cl. 65—70
9 Claims

ABSTRACT OF THE DISCLOSURE

A multi-staged arcuately-driven machine for centrifugally molding hollow glass articles. An apparatus for receiving molten gobs of glass in a mold partially pressing the glass into the desired shape at a station different from that where the glass was introduced, and spinning to final configuration, followed sequentially by scoring the glass articles at yet another station so that an unwanted portion can be subsequently removed therefrom.

This invention relates to the manufacture of hollow articles by the combination of pressing and centrifugal molding action; more particularly, the present invention relates to apparatus for and method of molding frusto-conically shaped hollow glass articles by a combined non-concurrent press-and-spin process.

More specifically, the present invention relates to the manufacture of hollow glass funnels or envelope members of cathode ray picture tubes utilized in television reception.

The invention herein disclosed, illustrated and described is specifically adapted to the manufacture of hollow glass funnels which form a portion of the body members of cathode ray picture tube envelopes for television reception and particularly cathode ray tube envelopes having rectangularly-shaped viewing screens.

For some time television pictures in both monochromatic and polychromatic array have been transmitted to screens having a generally rectangular pattern with a screen ratio in the range of 4:5. Rectangularly-shaped screens have become quite conventional for recreating and displaying such pictures.

Previous to the present time, the prior art of manufacturing all-glass television picture tube envelopes provided circular viewing screens, however, such screens have been reduced to a minority and have for practical purposes become obsolete because of the fact that peripheral areas of the transmitted pictures were lost when they were reproduced on a viewing screen of altogether different geometric configuration. Along with the increase in popularity of a great variety of sizes of viewing screens and space requirements in making transistorized television receivers, rectangular screen tubes are now employed almost entirely in the industry. In recent years the so-called wide-angle "square-look" television tube envelopes have attained still further popularity in providing both larger and more definitely rectangular contoured viewing screens. Such cathode ray envelopes of rectangular configuration have an added attribute in that they possess a reduction in overall tube length. The reduction in tube length thus permits a more compact television receiver unit to be constructed. The wide electron-beam deflection angles with a minimum of distortion are achievable primarily because of the reentrant corners provided in the internal apex contour of rectangular envelopes.

As presently manufactured, a cathode ray picture tube envelope or bulb is made by separately fabricating a hollow glass funnel which constitutes the tube body section. The separately fabricated face plate and the funnel portion are subsequently sealed together at complemental edges of similar contour by fusing the two parts together or by utilizing a solder or sealing glass.

The frusto-conical funnel portion of the television tube has in the past been manufactured by centrifugal molding action wherein a charge of molten glass is deposited in the apex area of a hollow upwardly-facing mold. Immediately after the glass gob has been dropped into the mold, the mold is rotated about its vertical axis to form the hollow funnel. The large open end of the frusto-conical glass funnel is initially formed to the desired contour with a moil portion attached thereto which is trimmed from the funnel before ultimate sealing is made to a face plate member.

In addition to the trimming operation that is sometimes performed on the large end of the funnel, a short tubular portion is usually formed integral with the hollow funnel at the small end thereof. The rather thick initially formed short tubular portion at the apex of the funnel is subsequently severed and replaced by a longer tubular neck member which houses the electron-beam emitting gun or guns. The above-outlined steps in the fabrication of a television tube envelope are equally applicable to both circular and rectangular cathode ray tube bulbs.

Heretofore, and as taught by the prior art, funnel members of picture tube envelopes of certain types, i.e. having prescribed beam deflection angles such as 70° and 90° and generally rectangular outline at their large ends, have been formed by centrifugal molding action by modifying the mold wall contours. In order to overcome the lack of uniform radial symmetry in a mold cavity having a non-circular contour at its large open end, mold wall contours at an intermediate area of the mold between its lower and upper regions have been modified to regulate the glass flow patterns during movement of the molten glass on spinning. This is done to obtain desired glass distribution over the mold wall especially during mold acceleration causing upward and outward movement of the glass. Modification of the mold wall contours has been practiced in forming certain non-circular shapes to obtain arrival of the leading edge of the advancing molten glass at the upper open end of the mold cavity in a uniform pattern and at substantially the same time along its complete periphery.

This has been accomplished to the extent it has been successful by varying the slope of the mold wall at an intermediate area adjacent the mold apex region in which the molten glass charge is deposited to control resistance to flow of the glass on accelerating rotation of the mold. This practice has been followed chiefly in the manufacture of funnel members for tubes having a beam deflection angle interiorly of the funnel small end of 70° or 90° and been limited thereto. Forming the rectangular outline of the funnel large end which can be defined as a modified ellipse consists of forming a series of modified ellipses in the intermediate area of the mold funnel extending in an axial direction wherein the major and minor axes of the elliptical contour thereat are in the opposite relationship as compared with the funnel large end. Such modification forms bulges on the short axis sides and generally flattened areas on the long axis sides in the intermediate transition zone of the funnel as molded. In order to overcome problems of angular movement or slippage of the molten glass over the contoured mold surfaces, it has also been found desirable particularly in making larger sizes of tube funnels to adjust the wall contour in the intermediate area to compensate for such slippage resulting from mold acceleration. The axes at least at a portion of the elliptically contoured area can be shifted forwardly in the direction of mold rotation to compensate for angular movement or slippage of the glass due to inertia. All of such correction has by necessity been built into the contour of certain molded articles as formed and been restrictive in designing new tube envelope shapes for fabrication by centrifugal molding. A mold construction for practicing such principles is illustrated in U.S. Pat. No. 2,662,347 to Giffen, issued Dec. 15, 1953, entitled "Glass Forming Molds."

Further, in the manufacture of funnel members for cathode ray tube envelopes having both circular and rectangular large ends, it has been conventional to introduce a charge of molton glass into the upwardly-facing open-topped mold which is then rotated to distribute centrifugally the major portion of the glass charge over the wall of the mold while advancing an annularly-shaped tool downwardly into the tubular apex region of the mold to contact and shape the glass therewithin. Such forming of the apex area of the funnel is necessary to achieve formation of the funnel vortex region with desired wall thickness and arcuately contoured outwardly-flaring surfaces in an area of the mold where small moments of inertia are applied to the molten glass charge upon centrifugal casting. The prior art has shown the formation of the vortex end of the funnel simultaneously with mold rotation to provide cylindrical and conical contours thereat having truly circular cross-sections and desired wall thickness. Normally, an electrical yoke element having a circular internal contour adapted to create an electromagnetic field to effect proper beam deflection and scanning of the viewing screen is mounted externally in close proximity to the juncture area of the funnel small end and its neck tubulation. Precise control over forming the contour and dimensions of the tube sidewalls in this region is imperative for satisfactory clearance and control of the cathode ray electron beam which scans the tube screen. Where the deflected beam is surrounded by sidewalls which are circular in cross-section and the raster which is scanned is rectangular in cross-section, the raster must be given proper clearance in the yoke region as well as adjacent areas of the funnel small end to prevent the formation of shadows at corners of the tube screen. This condition known as "neck-shadow" may occur when the deflected beam at the diagonals of its rectangular pattern is interrupted or distorted by the envelope sidewalls. The industry has proceeded from beam deflection angles increasing from 70° to 90°, and then to 110° to 114°, to overcome problems of excessive bulb weight and overall length of the picture tubes in providing large-size picture viewing screens. The latter beam angles are utilized in so-called wide-angles bulbs.

Cathode ray tube envelopes and methods of forming the body portion thereof having improved electron beam deflection contours at the funnel small end are described and illustrated in U.S. Pat. No. 3,132,017 to Coleman et al., issued May 5, 1964, entitled "Method of Forming Cathode Ray Tube Body Portion." This patent relates to tube envelope structures and methods of forming which provide more efficient use of beam deflection power by forming the inner surfaces of the funnel vortex area into a non-circular outline to facilitate the immergence of the rectangular raster as it is developed for scanning the full rectangular viewing screen.

The instant invention now proposes an improved apparatus and method of making the funnel portion of a cathode ray tube of the type heretofore described and set forth in U.S. Pat. No. 3,132,018 to Prendergast et al., issued May 5, 1964 and assigned to the assignee of the present invention.

Briefly, the apparatus of the present invention includes an array of circumferentially disposed molds each rotatable about a vertical axis and defining an apex portion adjacent the lower extremity thereof. Molten glass is introduced into one of the molds at a particular station. The mold is then indexed or translated to another location whereat a vertically movable pressing plunger is insertable in an axial direction into the mold thus coming into pressing contact with the molten glass previously dropped into the mold. The pressing plunger is retractable from contact with the molten glass and the formation of the glass article is achieved by the centrifugal force resulting from rotation of the mold. Subsequent to the centrifugal formation of the glass article, the mold is indexed to yet another station where the glass is scored by an axially extendible and retractable scoring device which permits subsequent disengagement of the moil section of the glass article. The mold and its internally contacted glass article is then indexed through a series of stations while the glass article undergoes a controlled reduction in temperature.

The apparatus also includes a control system which is sequence operated to carry out the various steps of the process including all of the operational steps performed at each one of the mold stations.

It is therefore an important object of the present invention to provide an apparatus for the formation of a glass article by a centrifugal molding sequence wherein the pressing and centrifugally forming, scoring and subsequent cooling are performed at different stations.

A further object of the present invention is to provide an improved method of and apparatus for the formation of a glass article by a centrifugal molding process wherein a portion of the article is press formed prior to and separately from the centrifugal molding.

An additional object of the instant invention is to provide an apparatus for the manufacture of a glass article by a combined pressing and centrifugal casting technique which includes a pressing plunger that is supported from a central part of the apparatus that is in axial alignment normal to the path through which the apex of the article molds traverse.

A still further object of the present invention is the provision of an apparatus for a combined pressing and centrifugal molding operation including a pressing plunger and a rotatable mold, the apparatus combining and comprising an electrical system and a fluid pressure actuated control system which is sequentially operated to perform the manipulative steps necessary to create a glass article of the desired configuration.

Another object of this invention is the provision of the method of making a cathode ray tube envelope or the like having a press-formed interior portion and a centrifugally molded portion by first press forming a portion of the article intermediate a pressing plunger in a centrifugal mold held against rotation in a rotatably oriented position followed by retraction of the pressing plunger from contact with the molten glass, and then freeing the mold for rotation followed by rotating the mold to centrifugally shape the glass article.

Yet another important object of this invention is an improved method for making a glass article including a station for the entry of a glass gob into a mold, indexing the mold containing the glass gob to a position relative to that wherein the glass gob was dropped into the mold, pressing the glass gob while in the mold to partially shape the glass article to its final configuration, withdrawing the pressing plunger, spinning the mold to centrifugally form the remaining final configuration of the glass object, and indexing the mold to additional stations for scoring and subsequent cooling and removal of the glass object from the mold.

Other objects of the present invention will appear and immediately become evident in the following description and appended claims, reference being had to the accompanying drawings forming a part of this specification wherein like reference characters designate corresponding parts in the several views.

In the drawings:

FIG. 1 is a perspective view of the overall apparatus of the present invention.

Figure 4:
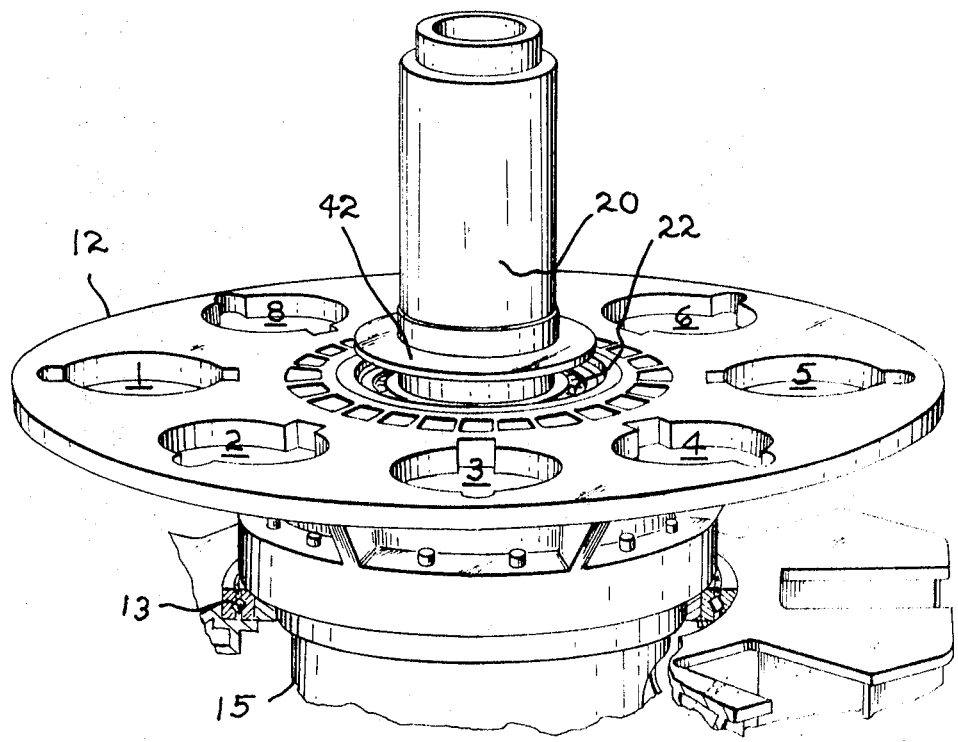

FIG. 4 is a perspective view of the center support column and the structure which forms the rotatable table.

Figure 5:
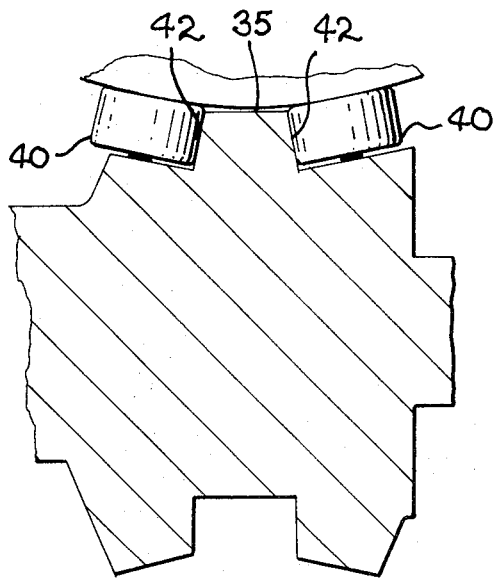

FIG. 5 is a cross-sectional view, taken along the lines 5—5 of FIG. 1 and which shows the relationship between the drive cam and cam rollers.

Figure 6:
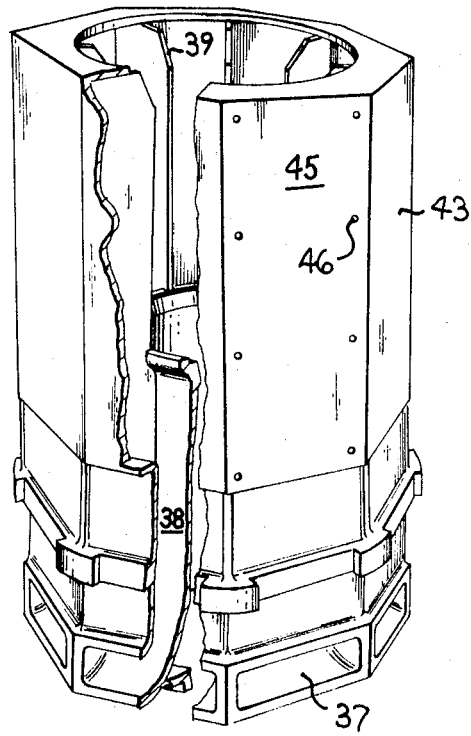

FIG. 6 is a perspective view, part in section, of the upper support structure of the apparatus shown in FIG. 1.

Figure 7:
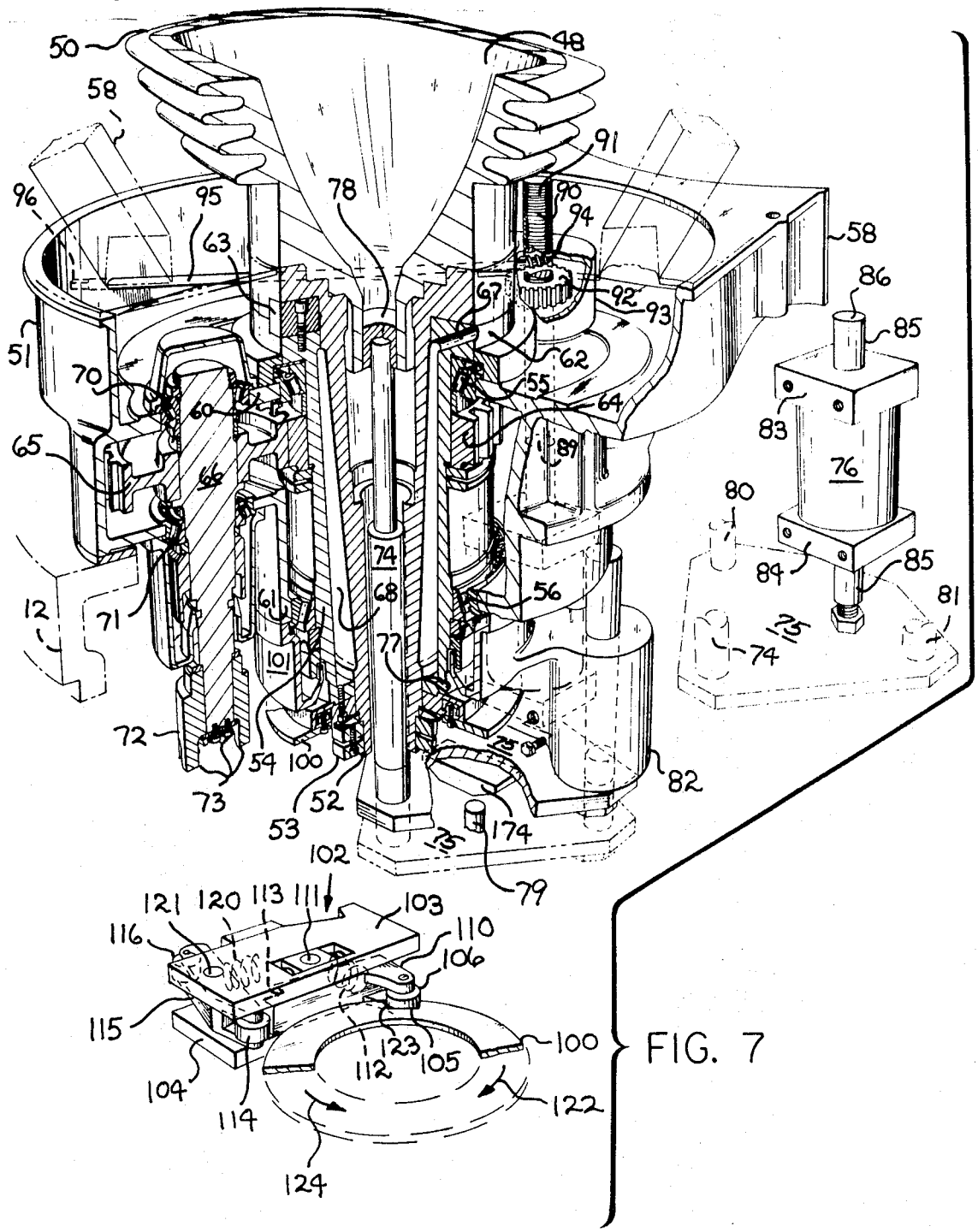

FIG. 7 is a cutaway perspective view showing partly in section the mold support and drive mechanism.

Figure 8:
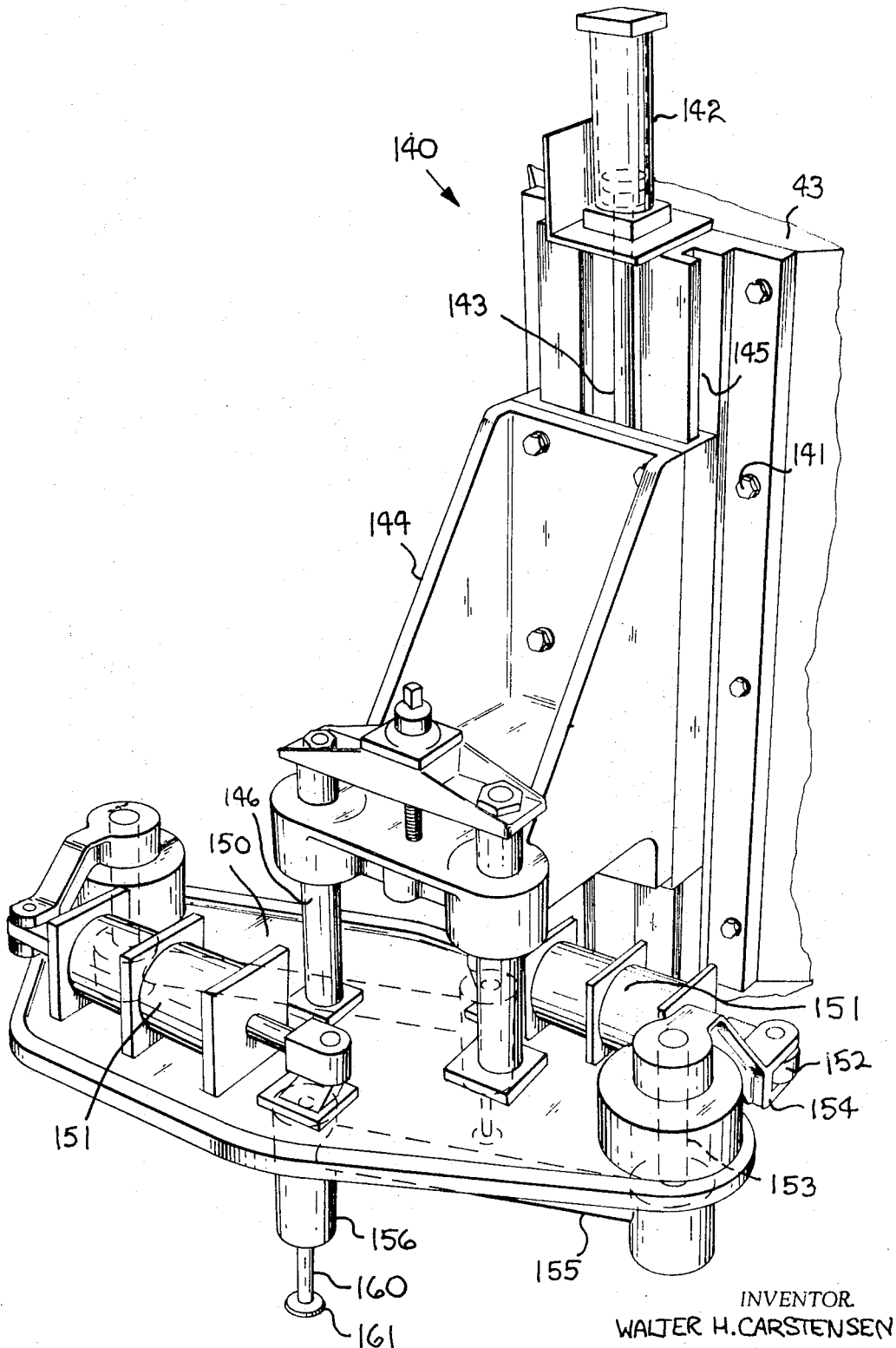

FIG. 8 is a perspective view of the moil severing apparatus which is attached to the apparatus of FIG. 1.

Figure 9:
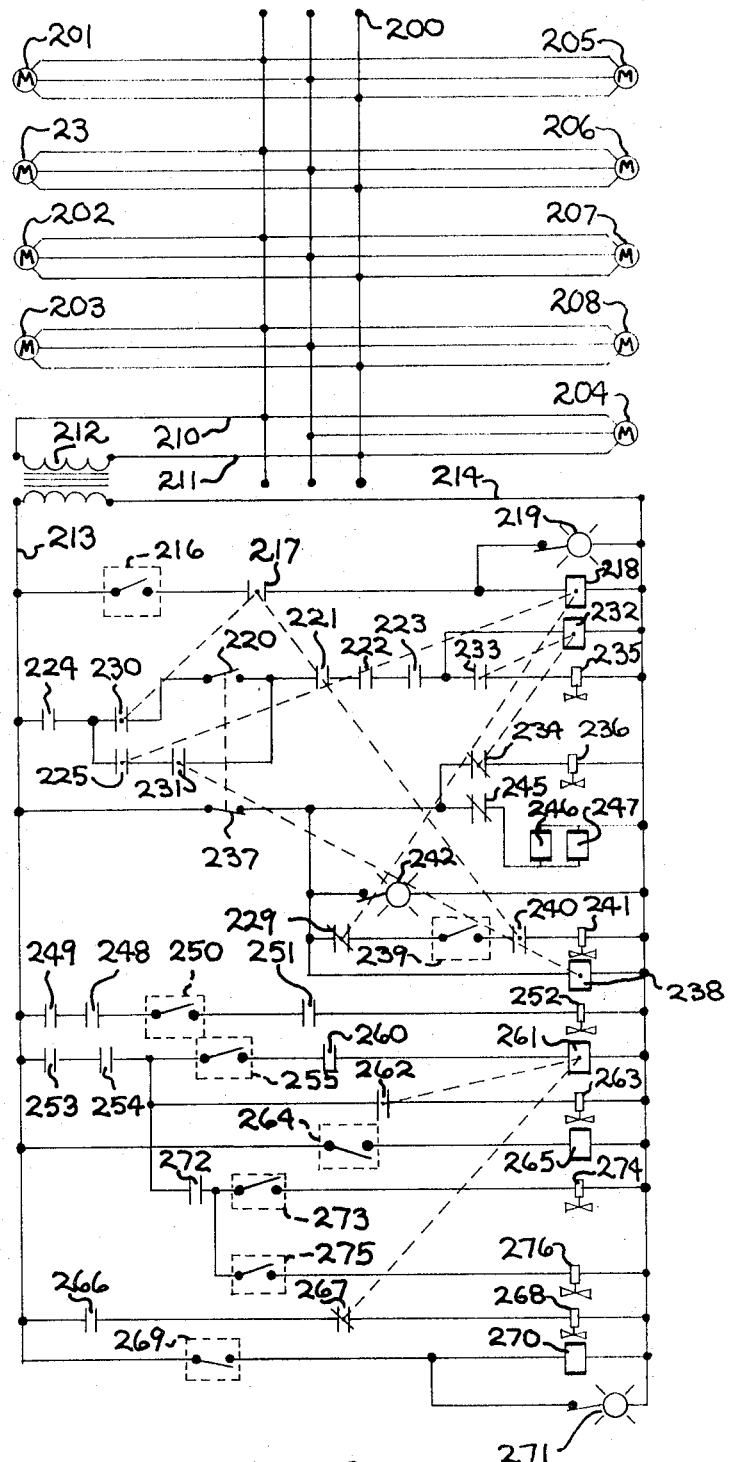

FIG. 9 is a wiring diaphragm which shows typical circuitry for a portion of the apparatus.

Referring to the drawings, FIG. 1 is a perspective view of the centrifugal casting machine which is the subject of the present invention. Reference numeral 10 refers generally to the overall assembly which comprises an upright machine that is supported from a base structure 11. Located near the midpoint between the base 11 and the top of machine 10 is a table 12 that revolves about the vertical axis of machine 10. Mounted in an upwardly-facing direction from table 12 are a plurality of circumferentially spaced mold stations each of which contains an essentially identical glass receiving and spinning mold. Separate functions are performed by the tooling located at each one of the mold stations. For example, a gob of molten glass is dropped into one of the preheated glass receiving molds. The table 12 is then rotated thus moving the mold containing the glass gob to a new work station circumferentially spaced from the initial location where the molten glass was dropped into the mold. At the new location and under the influence of a press mechanism the molten glass is partially shaped to final or near final configuration in certain specific areas of the glass article which is to be ultimately produced. The mold is spun to additionally shape the glass article to final configuration. By additional rotation, table 12 carries the mold and the partly formed molten glass article to another work station where unwanted portions of the glass article are partially severed from the main body of the glass article. Further work stations are provided so that the glass article may be cooled sufficiently in order that it will not deform upon removal from the mold. Thus it can be readily visualized that the present invention provides a series of molds that proceed in a continuous progression about a circumferential path defined by a rotatable table which is, in turn, mounted for rotation about a vertically aligned axis which coincides with the vertical axis of the overall machine 10.

Going into the present invention in more detail, FIG. 1 shows base structure 11 which is in the form of a casting or weldment. Normally, base 11 is supported on specially designed supports that may be at least one story below the elevation where the actual work is being done on the glass articles. Base structure 11 is quite massive since it must support a very heavy piece of equipment and at the same time maintain deflections within minimum tolerances.

A main bearing 13 with a rather larger diameter is supported from the top central section of the base structure 11. Bearing 13 is shown partly cutaway as can be seen in the lower central portion of FIG. 1. Bearing 13 is capable of accommodating the horizontal thrust loads as well as the vertical load of table 12 and all of the parts supported thereon.

Figure 2:
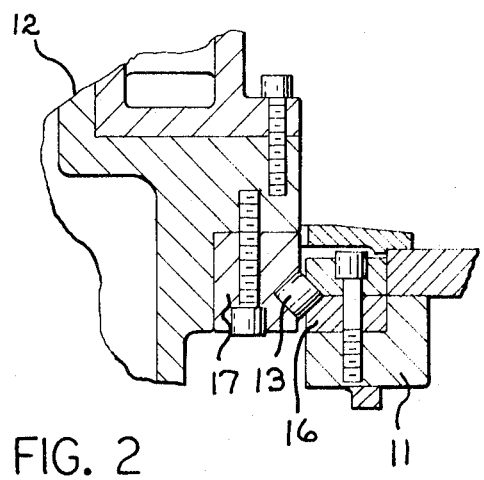
FIG. 2 is a cross-sectional view, taken along lines 2—2 of FIG. 1 which shows in detail the main bearing support.

FIG. 2, which is a cross-sectional view taken along lines 2—2 of FIG. 1, shows in more detail the mounting arrangement for main bearing 13. Bearing 13 is held in position by bearing races 16 and 17 which are, in turn, anchored by bolts to respectively base structure 11 and the bottom peripheral edge of the cylindrical portion of table support housing 15.

Additional bearings are utilized to stabilize table 12 as can be seen at 14 in FIG. 1. Bearing 14 is firmly anchored to the bottom of base structure 11 and provides a rotatable horizontal support for the lower edge of table support housing 15. Bearing 14 and its relationship to support housing 15 and base structure 11 can be seen in FIG. 3.

Figure 3:
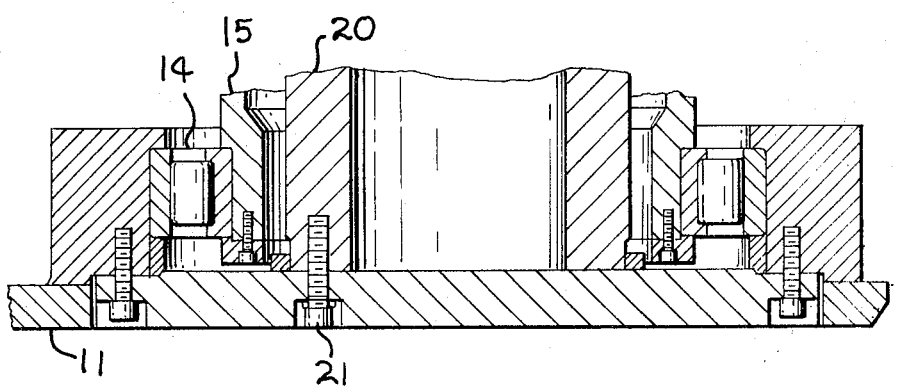
FIG. 3 is a cross-sectional view, taken along lines 3—3 at the base of the apparatus as shown in FIG. 1 and which shows the center support column.

FIG. 3 is a cross-sectional view taken along lines 3—3 of FIG. 1 which shows the base structure 11 at the bottom center location where bearing 14 supports the lower end of support housing 15. Also shown radially inward from support housing 15 is a center support column 20 that is anchored in a vertical attitude, by means of bolts 21, to base structure 11. Support column 20 is cantilevered in an upward direction and extends up through the center of machine 10. Thus it can be seen that even though main bearing 13 can adequately support table 12 for rotation, lower bearing 14 provides additional stabilization particularly in a horizontal direction. The rotation of table 12 is entirely free from center support column 20 at the base thereof.

FIG. 4 is a perspective view of the top of table 12. Support column 20 can be seen as it protrudes in an upward direction after having passed through table 12 and support housing 15. Also shown in FIG. 4 is an upper bearing 22 which further stabilizes support column 20. Bearing 22 is mounted between support column 20 and the inner top edge of table 12 as heretofore mentioned. While main bearing 13 is capable of handling all of the loads associated with the apparatus, bearing 14 and, of course, bearing 22 provide additional rigidity which is an asset to a large moving mass such as table 12 and the parts carried and supported by it. The primary purpose, however, of bearing 22 is to provide lateral stability to center support column 20 since it must support a considerable load produced by the entire upper support system.

Returning now to FIG. 1 and particularly at the bottom of the view, an A.C. motor 23 is rigidly mounted to the base structure 11 by means of bracket 24. A drive belt 25 connects motor 23 with a fluid brake and clutch assembly 30 which, in turn, supplies a large rotational torque to conical worm gear set 31 and 32. Gear 32 is, in turn, mounted to a drum shaft 33. Drum shaft 33 is suspended axially by supports such as 34 and rotates about a fixed axle such as 36. The end of drum shaft 33 most remote from gear 32 has an annular support spiral cam 35. Spiral indexing cam 35 makes approximately one complete revolution as it convolutes about drum shaft 33. A plurality of cam wheels 40 are mounted in a circumferentially spaced array around the lower periphery of support housing 15. Cam wheels 40 are free to turn about their stud shafts 41 which are radially aligned with respect to the overall vertical axis of machine 10.

FIG. 5 is a cross-sectional view taken along lines 5—5 of FIG. 1 which shows how cam wheels 40 are positioned with respect to cam 35. In order to hold close tolerances and have virtually no backlash, cam wheels 40 press tightly against both faces 42 of cam 35.

Thus it is apparent that the train of power of motor 23 will cause support housing and table 12 to rotate about the vertical axis which coincides with the axes of the table 12, the support housing 15 and vertically aligned column 20. Fluid clutch 30 which is positioned between motor 23 and gear set 31, 32 acts to engage power from motor 23 long enough for drum shaft 33 to make one revolution. At that time, power is disengaged from clutch 30 and a braking action is applied thus halting the rotation of table 12. One complete revolution of drum shaft 33 will advance table 12 through an angle of 45° or one station since there are eight stations on the apparatus of the instant invention. It is apparent that the engagement and disengagement of clutch and brake assembly 30 can be timed for sequential operation that will advance table 12 from station to station.

In order to assure that table 12 remains in the position where it was indexed by cam 42 and to additionally minimize deflections and vibrations which could occur during the various manipulative operations performed, stabilizing wedge mechanisms 26 are ejected radially inward into a wedge receiving block 27 which is attached to the bottom of table 12 just below the horizontal surface upon which housing 51 is attached. A stabilizing wedge mechanism such as 26 is positioned on both sides of station 2 thus aiding the support of that particular section of table 12 which must withstand the downward force of the plunger as the molten glass article is partially formed. Stabilizing wedge mechanisms 26 are firmly anchored to the top of base structure 11, therefore, they can also minimize any vibrations associated with the spinning of the molds. Of course, stabilizing wedge mechanisms 26 are retracted radially outward from their support positions each time table 12 is indexed.

Referring now to FIG. 4, centrally aligned column 20 can be seen as it protrudes through and above table 12. Positioned well above and securely attached to column 20 is support collar 42. Collar 42 acts as the support basis for the entire upper support assembly 43 that can be seen in FIG. 1.

FIG. 6 shows partly in section a perspective view of upper support assembly 43 that is securely mounted to collar 42, as seen in FIG. 4, by bolts (not shown). Upper support assembly 43 serves two primary purposes. First, it carries air to the lower extremities of the molds. Second, it serves as a support for the various working assemblies that perform individual work operations on the glass article as depicted in FIG. 1. An air inlet stack 44 (FIG. 1) is mounted by conventional means on the top of upper support assembly 43 for the purpose of carrying air from an air source such as a blower (not shown). It is to be noted that upper support assembly 43 has an octagonal exterior configuration and that each of the eight generally flat surfaces 45 coincide with each of the mold stations that are numbered consecutively 1 through 8 and which are shown in FIG. 1. The various working assemblies are mounted to, for example, bolt locations 46 as shown in FIG. 6.

In FIG. 1 are shown eight mold locations which will be referred to as stations. Station 1 is located at the extreme left-hand side of machine 10 as viewed in FIG. 1. Stations 2 through 5 are shown from left to right as they progress circumferentially around machine 10. Stations 6 and 7 are not visible in FIG. 1 since they fall behind upper support assembly 43. Station 8 can be partially seen in the background behind stations 1 and 2.

Each station consists essentially of the same hardware insofar as the mold and its drive mechanism are concerned. A mold of rectangular configuration is shown in FIG. 1 and identified by numeral 50. While a rectangular mold is shown, it is to be understood that molds of other configurations can equally well be employed by the apparatus of the present invention. All that need be done is to remove the existing molds and install molds of different configuration.

The molds are mounted on the top of the table 12 so that the large or open end is facing upward with the mold axis perpendicular to the plane of rotation of table 12. Each mold 50 is spindled from a mold rotating mechanism that is contained in housing 51. Housing 51 is, in turn, anchored to the top of table 12 by conventional means (not shown).

FIG. 7 is a perspective view broken away and shown in section which shows mold 50 and the mechanism associated with the rotational movement of the mold. Table 12 can be seen in FIG. 7 at the extreme left edge thereof. Mold 50 contains an inside surface 48 which extends from the rather wide frusto-conical mouth of mold 50 downward toward the apex of the mold. The inside surface 48 actually extends in an axial direction down through a rather long stem 52 which is attached to mold 50 by conventional means. The lowermost end of stem 52 is threaded and contains a locknut 53 thereon. Locknut 53 anchors stem 52 of mold 50 firmly in position with respect to quill assembly 54. Quill assembly 54 is generally cylindrical in configuration and is journaled on an upper bearing 55 and a lower bearing 56. Bearings 55 and 56 are, in turn, mounted on inwardly extending flanges 60 and 61 which are a part of housing 51. In addition to contacting mold stem 52 at the lower extremity adjacent locknut 53, quill assembly 54 has an outwardly extending flange 62, at the top above upper bearing 55, which supports a complementary surface on the underside of mold stem 52. To further prevent relative movement between quill 54 and mold stem 52, a key 63 is bolted in a receiving notch formed in flange 62 of quill 54. Key 63 extends upwardly and into a corresponding reentrant portion of mold stem 52. One or more keys such as 63 thus prevent relative rotation between the aforementioned quill and mold.

Positioned approximately one-quarter of the way down the sidewall of quill 54 is a gear 64 which is firmly attached to the periphery thereof and held in place by appropriate gear spacers. Gear 64 meshes with gear 65 which is attached to vertically disposed shaft 66. Shaft 66 is journaled by bearings 70 and 71. Bearings 70 and 71 are mounted in flanged apertures that are formed in and are a part of housing 51. Shaft 66 terminates at its lower end with clutch shaft 72. A set of downwardly protruding teeth 73 are cut into clutch shaft 72.

When a rotational motion is applied to clutch shaft 72, shaft 66 will rotate upon bearings 70 and 71 thus causing gear 65 to also turn. Since gear 65 is intermeshed with gear 64, gear 64 will likewise rotate. Quill 54 thus rotates since gear 64 is firmly attached to its exterior. The stem 52 of mold 50 will rotate with quill 54 since it is rotationally immobilized therewith because of key 63. Thus it can be seen that a rotational torque applied through clutch shaft 72 will cause the mold 50 to spin.

FIG. 7 additionally shows an elongated cylindrical ejection rod 74 that is in axial alignment and contained within the stem portion 52 of mold 50. Ejection rod 74 serves to partially remove the ware from the mold subsequent to its formation by spinning. The top end of rod 74 terminates with a valve mechanism 78 that prevents the flow of molten glass into stem 52 of mold 50. Rod 74 is attached at its lower end to plate 75. Plate 75 is also attached to the end of actuator 76. Plate 75 is stabilized by means of pins 80 and 81. Pins 80 and 81 are slideably held in position by boss' such as 82; one of which is shown. Pins 80 and 81 will slide in boss' 82 and will thus permit rod 74 to be moved up and down within apertured stem 52. Actuator 76 by means of its attachment blocks 83 and 84 is also attached to the understructure of housing 51. When the piston rod 85 of actuator 76 is biased in one direction or in the opposite direction, plate 75 will also move correspondingly. FIG. 7 shows plate 75 and actuator 76 broken away from the central portion of housing 51 where attachment is made. Also at the center bottom of FIG. 7, plate 75 is depicted in dotted outline to show that it moves up and down as it biases ejection rod 74 up and down. The piston rod 85 of actuator 76 is double acting in that it extends both downward and upward from the actuator body. The top surface 86 of piston rod 85 butts against the bottom 89 of adjustment shaft 90. Shaft 90 contains threads 91 on the uppermost portion thereof. A gear 92 is fixed for rotation within housing 93 by bearings (not shown). The internal aperture that extends through gear 92 is also threaded for engagement with the threads 91 of shaft 90. A worm drive gear 94 meshes with the teeth on the exterior of gear 92. Worm drive gear 94 is attached to an adjustment shaft 95 which exits through housing 51 and terminates with wrenching surface 96.

The following adjustment can be performed by rotating wrenching surface 96. As shaft 96 is turned, worm gear 94 will cause gear 92 to turn. Since gear 92 is fixed with respect to vertical displacement, its rotation will drive shaft 90 either up or down according to the initial rotational force applied. By moving shaft 90, the vertical movement or upper limit of piston rod 85 can be controlled. Since piston 85 is the prime mover of rod 74, the vertical movement of rod 74 is also controlled. In this manner the ejection height of the finished ware can be adjusted and controlled.

FIG. 7 also shows at the extreme bottom of the drawing a locking and orienting mechanism 102 for mold 50. A ring 100 is bolted to the lower portion of quill 54 and is also shown in a broken-away view for greater clarity. Associated with ring 100 is the above-mentioned locking mechanism 102 that is suspended from the underside of lower housing 101. The actual attachment of locking mechanism 102 is not shown since the assembly has been separated for clarity. Locking mechanism 102 is formed from parallel oriented plates 103 and 104. Contained within plates 103 and 104 is the locking mechanism for immobilizing mold 50. The mold is, of course, immobilized and oriented during some of the work operations performed at the various stations located about table 12. A single reentrant or notched portion 105 is cut into ring 100. A small wheel 106 is used as a cam follower and is attached to a bifurcated member 110 which, in turn, is pivotally mounted by pin 111 between plates 103 and 104. A spring 112 continuously forces wheel 106 against the peripheral edge of ring 100. At the end of member 110 most remote from wheel 106 is a latch mechanism or notch 113 which is capable of receiving cam wheel 114. Cam wheel 114 is suspended from elongated member 115 much in the same manner as is wheel 106 and its corresponding support 110. Elongated member 115 is pivotally supported between plates 103 and 104. An additional cam wheel 116 is positioned so that it acts in a biased fashion against elongated member 115. The force applied by spring 120 is applied between the points defined by pin 121 and the axis of cam wheel 116.

During operation, mold 50 spins in a clockwise direction as shown by arrow 122. As soon as the initial torque is supplied to mold 50, cam wheel 106 will disengage itself from notch 105 and ride radially outward over radiused portion 123 until it is riding on the peripheral edge of ring 100. In so moving to the peripheral edge of ring 100, wheel 106 and bifurcated member 110 pivot about pin 111 thus causing notched portion 113 of member 110 to move toward ring 100. As soon as notch 113 clears cam wheel 114, cam wheel 114 will firmly engage itself on notch 113 thus locking wheel 106 out of contact with ring 100. With wheel 106 thus disengaged, mold 50 may then progress through its spin cycle.

As can be seen in FIGS. 1 and 7, mold 50 is not of circular configuration, therefore it must be oriented at the same position each time it is to receive a gob of glass and also such orienting capability can be beneficial at the takeout station. When such orienting of mold 50 is desired at a particular station, a fixed cam on the lower structure as, for example, base 11 acts against cam wheel 116 to force cam wheel 114 out of locking engagement with notch 113 of bifurcated member 110. The aforegoing disengagement of cam wheel 114 permits wheel 106 to once again ride on the periphery of ring 100. However, during the orientation cycle, mold 50 is rotated in a counter-clockwise direction as depicted by arrow 124. Since mold 50 can stop at any attitude once its spinning operation has been completed, the counter-clockwise orientation rotation can theoretically move ring 100 through approximately 360°. During such counter-clockwise rotation, cam wheel 106 will drop into notch 105 thus stopping mold 50 at the desired location.

Returning now to FIG. 1 and as previously mentioned, cooling air enters stack 44 from an air source (not shown). The air then travels downward through stack 44 where its velocity is regulated by damper 57. From stack 44 the incoming air passes into the apertured center of upper support assembly 43 which can be best seen in FIG. 6. The air is directed by vertically aligned baffles 39 into eight chambers such as 38. From chamber 38 the air exits from the upper support assembly via opening 37. Now proceeding to FIG. 7, the cooling air exiting from opening 37 passes into the upper interior of housing 51 through an opening 58. From the interior of housing 51 the cooling air is then directed in the prescribed amount on the exterior of mold 50 by vents 58. Additionally, air from the plenum chamber formed by the top interior of housing 51 is radiated inwardly through bore 67 that communicates between the interior plenum chamber of housing 51 and cooling void 68. At the very bottom of cooling void 68 the air can exit through orifices such as 77. As the cooling air passes downward through machine 10 as just described, it will remove the excess heat from molds 50 thus keeping them below the critical temperature at which the molten glass sticks to the inside surface 48 of mold 50. By proper baffling and strategically positioned dampers, the amount of air can be regulated at any particular station or location. For example, the air flow at the station where the glass article is removed from the mold is held at a minimum to reduce the danger of flying glass particles.

OPERATIONS PERFORMED AT STATIONS

Station 1

Referring to FIG. 1, station 1 which is shown at the extreme left is free of overhead obstructions so that a predetermined quantity of molten glass, commonly known as a gob, can enter the mold 50. The gob of glass is generally severed from a continuously or intermittently ejected stream of molten glass that is fed from a forehearth orifice. The associated forehearth and associated parts are not shown in FIG. 1, however, the direction of the free falling gob as it enters the mold is shown by arrow 125.

The mold 50 is oriented so that its rectangular position is always at the same position. The orientation of mold 50 has been described more fully in conjunction with FIG. 7 elsewhere. By orienting the mold prior to the dropping of the gob, the gob will lay in the same position each time. This is important because even though the gob is molten when severed, a certain shear history will be present in the glass, particularly at the cut surface.

By orienting the mold, the slight mark or history of the severed portion of the glass which is deposited in the mold can be made to occur at the same location time and again.

Station 2

After the gob has dropped into the receiving mold 50 at station 1, table 12 is indexed to station 2. A retractable clutch 126 is raised so that it engages teeth 73 of clutch shaft 72 and hence carries rotational power to shaft 66 as shown in FIG. 7. Clutch 126 is shown in just three locations in FIG. 7, however, there are clutches at stations 2 and 3 even though they have been removed from the drawing for clarity. At station 2, the mold 50 is held in its oriented position until plunger head 130 is lowered into pressing engagement with the gob of glass 131 depicted within mold 50. Plunger head 130 is attached to plunger shaft 133 which, in turn, protrudes from actuator housing 134. Actuator housing 134 is mounted in a vertical position on bracket 135. Bracket 135 is firmly supported by conventional means on one of the eight exterior support surfaces 45 as can be best seen in FIG. 6. After table 12 has been indexed so that the mold containing the hot molten glass is directly beneath the plunger head 130, table 12 is firmly locked into position, as has been described heretofore. Plunger shaft 133 is then lowered by means of actuator 134 so that plunger head 130 contacts glass gob 131 and thus deforms and distributes it about the apex of mold 50. Plunger head 130 is contoured on its exterior surface to produce adequate clearance in the corners of the finished funnel for the electron beams, as has been described in the first part of this specification, and that will subsequently find use with the completed article. After plunger head 130 has reached its maximum downward position, it is retracted in an upward direction. Immediately upon such retraction of plunger head 130, the partially deformed glass gob 131 is spun by mold 50 about its vertical axis by means of clutch 126 which is engaged with teeth 73 of clutch shaft 72. The centrifugal force produced by the spinning of mold 50 at station 2 causes the molten glass to travel outward and upward along the interior surface of mold 50 in the well-known centrifugal casting method. Glass gob 131 is quickly distributed over the interior of mold 50 and at the same time it retains the internal apex configuration imposed upon it by plunger head 130. Plunger shaft 133 is withdrawn in an upward direction so that it provides sufficient clearance for the mold containing the already formed but still molten glass article which was formed from glass gob 131. Stabilizing wedge mechanisms 26 are withdrawn from engagement with table 12 and table 12 is then rotated to station 3.

Station 3

By the time mold 50 has arrived at station 3, it has undergone an angular deceleration until its practically at a standstill. At station 3 another clutch such as 126 is engaged to the power train leading to mold 50. Mold 50 then undergoes a very slow rotational movement such as 10–20 revolutions per minute. Simultaneously with the slow rotation of mold 50 caused by the engagement of clutch 126 at station 3, a cutting assembly 140 is lowered in a direction toward mold 50 and the molten glass article contained therein. Cutting assembly 140 is mounted to one of the octagonal faces of upper support assembly 43.

FIG. 8 shows an enlarged perspective view of cutting assembly 140. Upper support assembly 43 is shown partially broken away; attachment points between cutting assembly 140 and upper support assembly 43 are shown at 141. Cutting assembly 140 consists of an actuator 142 which is supported at the very top of cutting assembly 140. Actuator rod 143 is attached to bracket 144 which, in turn, slides on vertically disposed tracks 145. Bracket 144 is cantilevered essentially in a horizontal direction and contains two vertically disposed parallel oriented support rods 146 which, in turn, are anchored by conventional means to the top surface of horizontal support plate 150. A pair of double-acting actuators 151 are supported from the top surface of horizontal plate 150. Since both actuators 151 act in a similar manner, only one such actuator will be described herein. Piston rod 152 of actuator 151 moves in an inward and outward direction with respect to actuator 151 according to the command signals fed to the actuator. Such inward and outward motion of piston rod 152 causes shaft 153 to undergo angular rotation since arm 154 is pivotally connected to the end of piston rod 152 and fixedly anchored to the top end of shaft 153. Shaft 153 extends downward through an aperture in horizontal support plate 150 and is fixedly attached to a cantilevered support bar 155. On the end of support bar 155 most remote from shaft 153 is a cutting head 156 which has protruding from its lowermost surface an elongated shaft 160 which supports at its lowermost terminus a cutting wheel 161. Cutting wheel 161 is supported through its center so that it may rotate quite freely. Also, the edge of cutting wheel 161 is beveled to assist in its penetration of the molten glass. Thus it can be seen that when a command signal is sent to actuator 151, cutting wheels 161 will move apart one relative to the other.

The entire cutting assembly 140 is lowered by means of actuator 142 until cutting wheels 161 have passed below the top peripheral edge of the molten article contained in mold 50. Cutting wheels 161 are biased apart one from the other by means of actuators 151. Cutting wheels 161 contact the interior surface of the molten article and since at station 3 the mold is revolved quite slowly, cutting wheels 161 will begin to score a horizontal ring around the interior of the glass article. Cutting wheels 161 follow the irregular contour of the glass article because double-acting actuator 151 will permit quite a fluctuation in the position of cutting wheel 161 while still maintaining wheel 161 in firm contact with the molten glass. Cutting wheels 161 can be brought to bear against the interior of the molten article either simultaneously or one cutting wheel can contact the glass and the second cutting wheel can be brought to bear against the glass and track in the groove already formed by the cutting wheel that was first brought to bear against the interior surface of the molten glass article. The cutting wheels 161 are in actual contact with the glass article for a minimum number of revolutions, preferably in the range of 1–5 revolutions. After the prescribed cut has been made around the molten glass article, the cutting wheels are moved together one with respect to the other thus removing them from contact with the glass article. The entire cutting assembly 140 is then biased in an upward direction until cutting wheels 161 clear the top of mold 50. Clutch 126 is disengaged from the power train leading to mold 50 and the entire assembly is ready to be further indexed.

Station 4

Table 12 is rotated until the mold containing the glass article is in alignment with station 4. A clutch 126 is immediately engaged so that mold 50 may be once again revolved in order to support the glass article which is still quite flexible because of its somewhat molten state. At station 4 a cooling mechanism 162 is lowered into the interior of the molten glass article. Cooling air is then impinged upon the interior wall of the glass article to bring about a rapid reduction in temperature and thus solidifying the glass article. As can be seen in FIG. 1, cooling mechanism 162 is essentially a plurality of pipes or ducts 163 which, in turn, is supported in cantilevered fashion from a support casting 164. Casting 164 is attached to slideable block 165 which in a manner similar to bracket 144 is mounted on vertical slides 166. The upward and downward motion of block 165 along slides 166 is achieved by an actuator similar to 142 which is used and shown at station 3 but not shown at stations 4 and 5. Only the actuator rod 170 is shown in FIG. 1 as it protrudes in an upward direction from the top of block 165. Also shown in FIG. 1 is an adjustment mechanism 171. Adjustment mechanism 171 permits ducts 163 to be positioned at various locations along the interior of the glass article contained in mold 50. Thus for different mold configurations and seasonal variations in temperature, adjustment mechanism 171 will permit a quick vertical adjustment of the cooling air that is introduced to the molding article in mold 50.

Station 5

Since the glass article is not sufficiently cooled at station 4 by the time table 12 is ready to again be indexed to meet the pace set by stations 1, 2 and 3, additional cooling must be performed at station 5. Additional cooling mechanism 172, which is similar to cooling mechanism 162, is positioned at station 5 and is lowered into the confinement of the glass article in a manner heretofore described. Mold 50 also is engaged to clutch 126 so that the mold may be rotated.

Station 6

Station 6 is similar in practically every detail to station 5 and station 4. Since station 6 is on the backside of the perspective view as shown in FIG. 1, only air inlet duct 173 is shown. At station 6 the rotation of mold 50 is continued, however, its r.p.m. is reduced because the glass article has solidified and has become self-supporting. Station 6 also has the capability of orienting the mold in a particular manner similar to the orientation that can be accomplished at station 1. By the utilization of ring 100 as shown in FIG. 7 and a locking mechanism similar to the assembly 102 also shown in FIG. 7, the mold 50 can be oriented at any desired attitude with respect to the overall machine 10. By orienting the mold at station 6, the completed glass article will be in a position for removal from the mold by an automatic take-out device (not shown). Additionally, orienting at station 6 can be valuable even when the completed glass article is manually removed from the mold.

Station 7

At station 7, which is not shown in FIG. 1, the already solidified glass article is ready to be extricated from the mold. The removal operation can either be by hand or by automatic take-out equipment installed on or adjacent assembly 10. Turning now to FIG. 7, the ejection of the glass article is achieved by the upward motion of rod 74 which is moved in an upward direction by means of hydraulic actuator rod 79 which is shown in FIG. 7 just below cam block 174. The end of hydraulic actuator rod is activated in an upward direction against the bottom of cam block 174. The hydraulic actuator associated with rod 79 is anchored to a portion of the base structure and can bias actuator rod 79 in a downward direction so as to clear overhead objects as table 12 is rotated. Cam block 174 also can serve as a means to raise rod 74 should actuator rod 79 fail to act and remain in an upward position. Thus it can be ascertained that actuator 76 can raise or lower rod 74, that hydraulic actuator rod 79 can raise rod 74 independently, and that cam block 174 can also raise rod 74 should actuator rod 79 remain in the up position. Cam block 174 can be seen in the cutaway portion through plate 75 at the lower central portion of FIG. 7.

Station 8

When mold 50 from which the already solidified glass article has been removed arrives at station 8, it is once again engaged to a clutch such as 126 for rotation. The ensuing rotation of the empty mold at station 8 aids in the cooling of the mold so that it will be ready to receive another charge of molten glass as soon as it arrives at station 1.

CONTROL SYSTEM AND OPERATION

The hydraulic and pneumatic systems have purposely not been shown in the interest of brevity since the action and actuation of such devices are considered to be well within the knowledge of those who are skilled in the art of designing automatic and automated machinery.

As illustrated in FIG. 9 of the drawings, an example of the electrical circuitry used in the operation of the present invention is shown schematically. All hydraulic pumps (not shown) and air sources should preferably be running and at optimum pressures before any part of the cycle can be run automatically. A series of interlocks and safety features are used throughout the apparatus of the present invention. For example, the table cannot be rotated or indexed when any one of the tools is in an extended position. Such rotation of the table with any of the tools out of position would only damage a portion of the equipment. The interlock system is implemented by cams and microswitches employed at strategically located positions which generally represent the extreme movable positions of the various components.

In FIG. 9 a 440-volt three-phase 60-cycle electrical source is employed as at 200. A series of electrical motors are tapped off the lines which carry the incoming current. Motor 201 drives the pump which supplies the hydraulic pressure to clutch mechanism 126 as can be seen in FIG. 1. Motor 201 is solely responsible for the hydraulic pressure deliverable at station 2 because of the high acceleration demanded in the centrifugal dissemination of the molten glass within mold 50 at that station.

Motor 23, as shown at the bottom of FIG. 1, is responsible for indexing table 12 from station to station.

Motor 202 creates the hydraulic pressure necessary to spin the molds at stations 1, 3, 4, 5, 6 and 8. The spin requirement for station 2 was accommodated by motor 201 as set forth above. Note that there is no spin requirement at station 7 since the mold does not rotate at this station.

Motor 203 supplies the hydraulic pressure necessary for plunger actuator 134 (FIG. 1) at station 2. Through appropriate valving in the hydraulic system, plunger head 130 can be made to exert a downward force upon the molten glass and also plunger head 130 can be raised until mold 50 can be rotated therebeneath.

Motor 204 is utilized in order to supply the required hydraulic pressure within clutches 126 so that the central portion thereof will move into and out of engagement with clutch shafts 72 which, in turn, carry the rotational power to the molds.

Motor 205 supplies the hydraulic pressure for activation of cutting assembly 140 as shown in FIG. 8. The hydraulic pressure as supplied by motor 205 raises and lowers assembly 140 along tracks 145 thus causing cutting wheels 161 to be moved into position where they can act upon the molten glass article already formed in mold 50.

The hydraulic pressure for raising and lowering cooling mechanism 162 into and out of engagement with the interior of mold 50 is also supplied by motor 205.

Motor 206 in a manner similar to motor 205, supplies the hydraulic pressure necessary for the raising and lowering of the cooling mechanisms at stations 5 and 6.

A pressurized lubrication system is maintained throughout the apparatus and pressure for such system is supplied by motor 207.

Motor 208 acts to supply a rotational force to a speed changer and servo-drive combination which regulates the speeds at which mold 50 is driven at station 2.

Leads 210 and 211 are taken off 440 source 200 and fed into transformer 212. A reduced voltage of 110 volts is taken off the secondary of transformer 212 and attached to lines 213 and 214.

The timing sequence of the various operations is controlled by means of, an adjustable in motion, cam timer with a plurality of cams.

As the apparatus of the present invention is ready to index, that is, the table 12 which supports all of the molds 50 is ready to rotate, the following sequential operations occur.

Because of the rotation of a mechanical sequence timer (not shown), timer switch 216 is moved from its normally open position to the closed position. Contacts 217 which are shown in the normally open position are closed by manipulation of a selector switch that is manually thrown by the operator when the entire apparatus is put on the automatic cycle condition. Relay 218 becomes energized as soon as switch 216 and contacts 217 close the circuit to relay 218. Light 219 comes on indicating completion of the initial circuit and the start of the indexing cycle. Contacts 225 also close when relay 218 is energized.

At the beginning of indexing, limit switch 220 is held in the open or as shown position. Contacts 221, 222 and 223 are associated with a safety interlock system. Contacts 221 will close only when activated by a relay (not shown) that indicates that all clutches 126 as shown in FIG. 1 are in the down or disengaged position. Contacts 222 when activated by the appropriate relay indicate that all tooling such as the plunger 130, cutting assembly 140 and air cooling heads such as 162 are in the up or clear position. In a similar manner contacts 223 close only when the appropriate signal is received indicating that all of the table stabilizing wedge mechanisms 26 are in the disengaged position. When the initial selector button (not shown) has been activated by the operator, contacts 224 will move from the normally open position to the closed position. As mentioned before, contacts 225 move to the closed position when relay 218 is activated. Moving to contacts 240, it can be seen that they close along with the closing of contacts 217 and 230. Of course, with 225 closed and 231 closed, current can then pass therethrough and also through 221, 222 and 223 thus energizing relay 232. When relay 232 is energized, then contacts 233 will close and contacts 234 will open. As soon as contacts 233 close, solenoid 235 will be energized thus releasing the brake on the clutch 30 as shown at the bottom of FIG. 1. The release of the brake on clutch 30 permits motor 23 to drive gear 31 which, in turn, transmits the power to drum shaft 33 to make one revolution and index table 12 through one station. During the indexing, limit switch 237 will open and limit switch 220 will close. Thus, relay 238 will be deenergized and contacts 231 will be opened. When timer switch 216 phases out, the current flow will be interrupted to relay 218 thus deenergizing it. Contacts 225 will then open to keep indexing from occurring until the proper command is once again imposed through the action of mechanical sequence timer via switch 216. At completion of index, switch 220 then goes to open position and likewise limit switch 237 will close. As 220 goes to open position 232 will be deenergized and 233 will open as 234 moves to the closed position. As solenoid 235 is deenergized, the clutch powering the indexing drive will be disengaged. Solenoid 236 will once again be energized and furnishing the signal for the application of the brake to clutch 30. At the time the indexing of table 12 has been accomplished, light 242 will come on.

Once the table 12 has been indexed as heretofore described, timer switch 239 will move to the closed position under the influence of the mechanical sequence timer. Contacts 240 are already closed when relay 217 is initially activated. Contacts 245 are in the closed position so long as stabilizing wedge mechanisms 26 protrude radially inward into their sockets 27 in the outer periphery of table 12. As soon as mechanisms 26 are in the position, and consequently through the action of closed contacts 245, relays 246 and 247 will be energized thus their contact will permit the tooling at the various stations to operate. For example, energizing of relay 246 will close contacts 248 thus permitting clutch 126 to come up into engagement with clutch shaft 72 for rotation. Contacts 249, like contacts 224, are closed by the activating of the initial start switch by the operator.

When timer switch 250 is closed by the operation of the multiple cam timer, then current can flow through solenoid 252 since contacts 251 have already been closed at the same time as contacts 217, etc. by the closing of the initial start switch by the operator.

Going further, a typical station function will not be described. At station 4 cooling assembly 162 moves up and down according to the commands of the time sequence settings. Contacts 253, are in a manner similar to contacts 224 and 249, moved from the normally open position to the closed position when the operator activates the start button. Contacts 254 close under the influence of relays 246 and 247 in a manner similar to contacts 248 heretofore set forth. Switch 255 is, of course, closed because of the action of the multiple cam timer. Contacts 260 are closed by the activation of the initial selector switch which was triggered by the operator at the time the apparatus was put on the automatic cycle sequential operation. Thus it can be seen that with electrical continuity in the line containing relay 261, relay 261 will be energized. As relay 261 is energized, normally open contacts 262 will move to the closed position. Solenoid 263 is energized thus supplying the actuation signal for hydraulic fluid to the actuator controlling actuator rod 170 thus lowering assembly 162 into mold 50. When assembly 162 has reached the desired lower position, limit switch 264 closes thus supplying current to relay 265. Energized relay 265 then, in turn, turns on the temperature-controlled air supply that is carried in from the overhead duct lines.

Contacts 266 are also closed by the action of the operator when the start button is pushed, however as previously described, relay 261 was activated by normally closed contacts 267 when they moved to the open position. When relay 261 was deenergized by the timing out of 255, contacts 267 once again moved to the closed position thus permitting current to flow through contacts 266, 267 and hence to solenoid 268 which acts to raise the cooling head 162 after the mold 50 has progressed through a spin cycle at station 4. When the cooling head 162 is at the top of its upward travel, limit switch 269 is closed thus energizing relay 270 which, in turn, sends a signal to the overall control center indicating that the cooling head is up. Light 271 is also activated by the tripping of limit switch 269.

Simultaneously with the lowering of cooling head 162, contacts 272 are in a manner similar to contacts 260 closed by the initial operation of the start switch or button. Timer switch 273 is moved to the closed position, therefore current can pass through contacts 272, switch 273 and thus energize solenoid 274 which acts upon the hydraulic system to engage the clutch 126 to the input drive 72 of the mold 50. As switch 273 is moved to the closed position by the sequential timer, switch 275 is also closed thus energizing solenoid 276 which starts the spinning of mold 50 through an appropriate motor and clutch 126. As switch 275 is permitted to open, spinning of mold 50 will stop and likewise the opening of switch 272 will permit disengagement of the clutch.

While certain representative embodiments and details have been shown for the purpose of illustrating the invention, it will be apparent to those skilled in this art that various changes and modifications may be made therein without departing from the spirit or scope of the invention.

What is claimed is:

1. In a centrifugal casting apparatus for shaping glass articles which includes a frame for supporting the apparatus, the improvement of an upright center support column cantilevered vertically from said frame, a rotatable mold carrying table surrounding a portion of said column and mounted from said frame, a tool accommodating assembly affixed to said column and extending above said table, a plurality of glass forming tools attached to said assembly and adapted for movement into and out of working engagement with the molds on said table.

2. In a centrifugal casting apparatus for making a glass article in an open-topped mold rotatable about a vertical axis and receiving a molten glass gob from an overhead feeder, the improvement comprising: frame means for supporting both rotatable and fixed portions of the apparatus, a center column cantilevered vertically from a central lower section of said frame means, a table journaled from said frame about said center column which is adapted to support for centrifugal rotation a plurality of annularly spaced molds, power means attached to said frame means for engagement and disengagement with said molds, a plurality of arcuately positioned tools suspended from tool support means mounted on said center column and means associated with said tools to raise and lower them into engagement and disengagement with a glass article in said molds.

3. An apparatus for shaping a glass article in which the glass articles are moved through a series of stations, said apparatus comprising a glass gob receiving station for the introduction of molten glass from a forehearth, a pressing and spinning station where the glass article is partially formed by pressing followed by centrifugal spinning to final configuration, a moil scoring station where a peripheral indentation is formed in the molten glass article, a plurality of glass article cooling stations where said article is cooled by fluid means, a take-out station where the glass article is removed from said apparatus, a cooling station where heat is removed from the mold prior to its reception of another charge of molten glass; said stations each comprising a substantially identical mold supporting and spinning apparatus mounted in an arcuate array on a rotatable table which is supported by frame means and which is rotated through sequential steps by a power source and gear means, separate power source means mounted on said frame means for said stations, said separate power source means supplying the energy necessary for rotation of the molds when at the various stations, a central support column mounted from said frame means and extending vertically through said table, a plurality of tool means mounted from said support column for performing work upon said glass article as it advances from station to station and power means for rotating said table.

4. An apparatus for forming a glass article including a base frame with a central aperture therethrough, a rotatable table suspended from a cylindrical part thereof that is mounted on bearings supported from said frame, a series of cam rollers circumferentially spaced and supported from the cylindrical part of said table, said cam rollers adapted for engagement with a tangentially disposed spirally oriented cam convoluted about a drum shaft which, in turn, is driven by a gear and motor arrangement mounted from the base frame, a plurality of mold spinning assemblies mounted in a vertically extending direction from the top of said table, said assemblies spaced circumferentially one from the other on said table, each mold assembly comprising a support structure capable of rotation in either direction, means for directing a rotational force from beneath said table to said mold, and means for partially ejecting the glass article from the confinement of said mold after it has become solid.

5. The method of forming a hollow glass article in a mold including the steps of:
(1) introducing a charge of molten glass into a mold,
(2) translating the mold to a position different from the position where said glass was introduced into said mold,
(3) inserting a pressing element into contact with the molten glass to press form the interior apex contour of said article,
(4) removing the pressing element from the confinement of the glass article,
(5) rotating the mold about its vertical axis to centrifugally distribute a portion of the glass over the interior surface of said mold, and
(6) removing the article from the mold subsequent to cooling.

6. The method of forming a hollow glass article in a mold including the steps of:
(1) introducing a charge of molten glass into a mold,
(2) translating the mold to a position different from the position where said glass was introduced into said mold,
(3) inserting a pressing element into contact with the molten glass to press form the interior apex contour of said glass article,
(4) removing the pressing element from the confinement of the glass article,
(5) rotating the mold about its vertical axis to centrifugally distribute a portion of the glass over the interior surface of said mold,
(6) translating the mold to a position different from the position where said centrifugal distribution occurred,
(7) scoring the interior surface of said article about a line that lies in a plane normal to the longitudinal axis of said mold, and
(8) removing the article from the mold subsequent to cooling.

7. The method of forming a hollow glass article in a mold including the steps of:
(1) introducing a charge of molten glass into a mold for the shaping thereof,
(2) translating the mold to a position different from the position where said glass was introduced into said mold,
(3) inserting a pressing element into contact with the molten glass to press form the interior apex contour of said glass article,
(4) removing the pressing element from the confinement of the glass article,
(5) rotating the mold about its vertical axis to centrifugally distribute a portion of the glass over the interior surface of said mold,
(6) translating the mold to a position different from the position where said centrifugal distribution occurred,
(7) scoring the interior surface of said article about a line that lies in a plane normal to the longitudinal axis of said mold, and
(8) translating the mold to a position different from the position where said scoring occurred, and
(9) removing the article from the mold subsequent to cooling.

8. The method of forming a hollow glass article in a mold including the steps of:
(1) introducing a charge of molten glass into a mold by gravitational force,
(2) translating arcuately the mold to a position different from the position where said glass was introduced into said mold,
(3) inserting a pressing element into engagement with the molten glass and pressing against the glass to form the interior apex contour of said glass article,
(4) removing the pressing element from the confinement of the glass article,
(5) rotating the mold about its vertical axis to centrifugally distribute a portion of the glass over the interior surface of said mold,
(6) translating arcuately the mold to a position different from the position where said centrifugal distribution occurred,
(7) scoring the interior surface of said article about a line that lies in a plane normal to the longitudinal axis of said mold,
(8) translating arcuately the mold to a position different from the position where said scoring occurred,
(9) introducing a controlled temperature cooling medium against the interior surface of said glass article to effect cooling thereof, and
(10) removing the article from the mold subsequent to cooling.

9. The method of forming a hollow glass article in a mold including the steps of:
(1) introducing a charge of molten glass into a mold by gravitational force,
(2) translating arcuately the mold to a position different from the position where said glass was introduced into said mold,
(3) inserting a pressing element into engagement with the molten glass and pressing against the glass to form the interior apex contour of said glass article,
(4) removing the pressing element from the confinement of the glass article,
(5) rotating the mold about its vertical axis to centrifugally distribute a portion of the glass over the interior surface of said mold,
(6) translating arcuately the mold to a position different from the position where said centrifugal distribution occurred,
(7) scoring the interior surface of said article about a line that lies in a plane normal to the longitudinal axis of said mold,
(8) translating arcuately the mold to a position different from the position where said scoring occurred,
(9) impinging a fluid of controlled temperature against the interior surface of said glass article to effect cooling thereof,
(10) orienting the glass article to a predetermined attitude to facilitate the removal from the mold,

(11) ejecting the glass article vertically from the interior surface of the mold, and
(12) removing the article from the mold.

References Cited

UNITED STATES PATENTS

| | | | |
|---|---|---|---|
| 1,190,145 | 7/1916 | Gift | 65—302 |
| 1,611,363 | 12/1926 | O'Neill | 65—361X |
| 2,662,346 | 12/1953 | Giffen | 65—71 |
| 3,132,018 | 5/1964 | Prendergast et al. | 65—71X |
| 3,150,951 | 9/1964 | Mayhew | 65—71 |
| 3,155,479 | 11/1964 | Zimmerman | 65—71X |
| 708,326 | 9/1902 | Ebeling | 65—361X |
| 687,595 | 11/1901 | Blue | 65—361X |

FRANK W. MIGA, Primary Examiner

U.S. Cl. X.R.

65—71, 72, 83, 177, 247, 248, 239, 361